April 7, 1925.
R. W. NEWCOMB
1,532,543
CONTROLLING AND TEMPERATURE COMPARING SYSTEM
Filed May 28, 1924
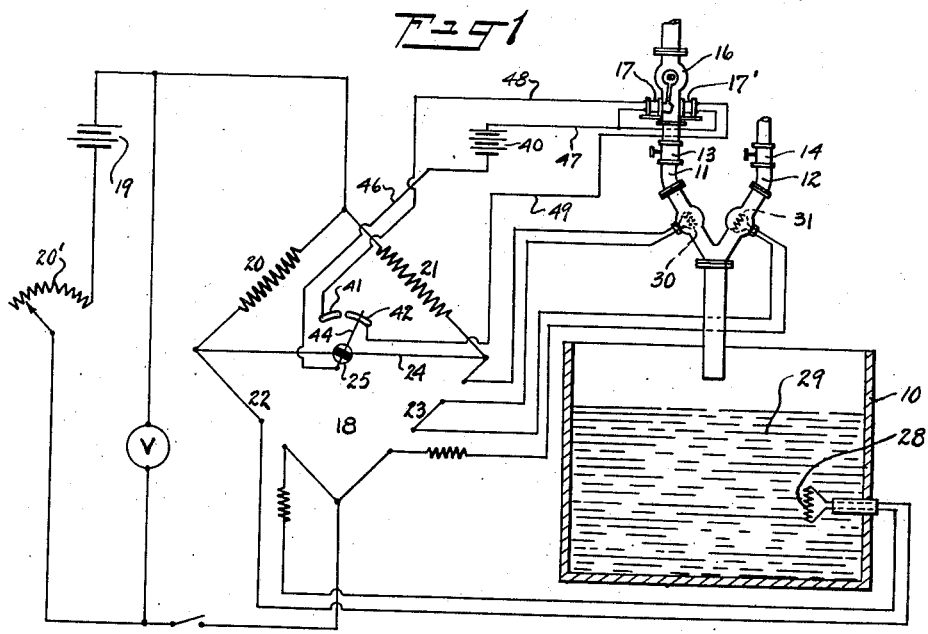
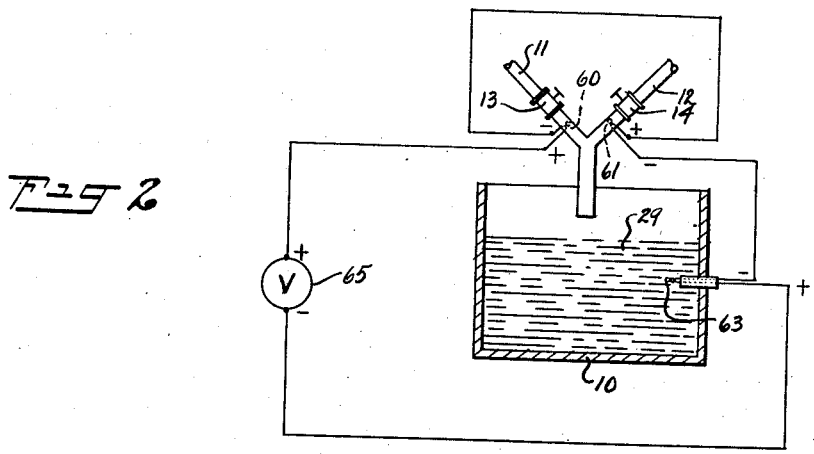
INVENTOR
R. W. Newcomb.
BY
Edwards, Sager & Bower.
ATTORNEYS Patented Apr. 7, 1925.

1,532,543

UNITED STATES PATENT OFFICE.

RALPH W. NEWCOMB, OF GREEN VILLAGE, NEW JERSEY.

CONTROLLING AND TEMPERATURE-COMPARING SYSTEM.

Application filed May 28, 1924. Serial No. 716,356.

*To all whom it may concern:*

Be it known that I, RALPH W. NEWCOMB, a citizen of the United States, residing at Green Village, in the county of Morris and State of New Jersey, have invented certain new and useful Improvements in Controlling and Temperature-Comparing Systems, of which the following is a specification.

This invention relates to an apparatus for measuring the relation between the average of two or more temperatures and a third temperature or the relation between the average of two or more temperatures and the average of two or more other temperatures. The invention also relates to a controlling system embodying such apparatus.

One use of my invention may be illustrated in connection with the mixing of two or more substances or reagents where such mixing is accompanied by the absorption or evolution of heat. Suppose, for example, it is desired to prepare 98% sulphuric acid by mixing in a container sulphuric acid of 100% strength and sulphuric acid of approximately 96% strength, these acids being supplied to the container through pipes. If the percentages of sulphuric acid in the two acids supplied remained exactly 100% and 96% the desired mixture containing 98% sulphuric acid could be obtained by supplying these two acids at the same rate. In practice however the percentage of sulphuric acid in the weaker of these acids will vary somewhat and it becomes of importance to know when such variation occurs in order to regulate the flow through one or the other of the supply pipes in order to maintain the concentration of the mixed product constant. I am able to detect such variation by comparing the temperature of the mixed acid with the average of the temperatures of the two supplied acids and from such comparison I may regulate the supply of acids so as to maintain the concentration of the mixed acid constant.

If two liquids of different temperature but of the same specific heat be supplied at the same rate to a mixing vessel and these liquids are of such a character that the mixing of the two does not result in absorption or evolution of heat, the temperature of the resulting mixture will be the average of the temperatures of the two liquids supplied. In the illustration above given, that is, in the mixing of sulphuric acid of different concentrations, such mixture results in the evolution of heat and the temperature of the resulting mixture is higher than the average temperature of the acids before mixing. The amount by which the temperature of the mixture exceeds the average temperature of the acids before mixing, depends upon the concentration of these acids and the relative rates at which they are supplied to the container. When 100% sulphuric acid and 96% sulphuric acid are supplied at the same rate the temperature of the mixture will exceed the average temperature of the acids supplied by a definite amount. If the concentration of the weaker acid rises above 96% the temperature of the mixture will exceed the average temperature by a less amount and if the concentration of the weaker acid falls below 96% the temperature of the mixture will exceed the average temperature by a greater amount. When the former of these conditions exists the mixture being formed is too concentrated and this may be remedied by increasing the rate at which the weaker acid is supplied or decreasing the rate at which the stronger acid is supplied. When the latter condition exists, the concentration of the mixture being formed is too low and such condition may be remedied by increasing the supply of strong acid or decreasing the supply of weak acid.

While my invention may be embodied in a variety of forms of apparatus, in the preferred form I provide a means for comparing the temperature of the mixture with the average temperature of the supplied materials by means of a Wheatstone bridge circuit, in the bridging portion of which is located a measuring instrument. In one leg of the bridge is a thermometer resistance which is subject to the temperature of the mixture and connected in series in an adjacent leg of the bridge are thermometer resistances, one of which is subjected to the temperature of one of the supplied materials and the other of which is subjected to the temperature of the other of the supplied materials. The electrical instrument may be calibrated to indicate the difference between the temperature of the mixture and the average temperature of the materials supplied or may in any other manner register the relation between these temperatures. The control of the rate of flow of one or the other of the materials supplied may be effected manually or automatically from the instrument.

Numerous objects and advantages of my invention will appear from the following description taken in connection with the accompanying drawing in which—

Fig. 1 represents diagrammatically an apparatus embodying one form of my invention and Fig. 2 is a similar view showing a modified form of my invention.

In the drawing 10 represents a mixing tank or other container adapted to be supplied from pipes 11 and 12 with the materials which are to be mixed. Pipes 11 and 12 are provided respectively with manually operated valves 13 and 14 and pipe 11 may be further provided as shown in Fig. 1 with a valve 16 operated by electro-magnets 17 and 17' to control the supply of fluid through the pipe 11. 18 in Fig. 1, is a Wheatstone bridge supplied with current from a source 19 through an adjustable resistance 20'. The bridge 18 comprises legs 20, 21, 22 and 23 and a bridging circuit 24 in which is connected a recording instrument 25 such as a recording voltmeter. Connected in the leg 22 is a thermometer resistance 28 which is adapted to be immersed in the mixed liquid 29 and the container 10. The resistance of the thermometer resistance 28 varies in accordance with changes in the temperature of the mixed liquid. Connected in series in the leg 23 of the bridge are two thermometer resistances 30 and 31, the resistance 30 being located in the supply pipe 11 and subject to the temperature of the liquid flowing therethrough and the resistance 31 being located in the supply pipe 12 and subject to the temperature of the liquid flowing therethrough. The resistance of the thermometer resistances 30 and 31 will ordinarily be each one-half the resistance of the thermometer resistance 28 when all of the resistances are measured at any one temperature.

From the circuit arrangements disclosed it will be seen that the potential at the left hand terminal of the bridging circuit 24 will vary in accordance with changes in temperature of the mixed liquid in the receptacle 10 whereas the potential at the right hand terminal will vary in accordance with changes in the averaged temperature of the liquids supplied through pipes 11 and 12. The difference of potential across the bridging circuit which is measured by the instrument 25 will therefore vary in accordance with the difference between the temperature of the mixed liquid 29 and the average temperature of the two supplied liquids. In the case of mixing acids as above described instrument 25 will give an indication of the concentration of the mixed acid and the operator may if desired manually operate one or the other of the valves 13, 14 to vary the rate of flow of one or the other of the acids in order to maintain the concentration of the mixed acid constant. This control of the flow of supplied acids may be accomplished automatically by means such as that shown conventionally in Fig. 1 in which 40 is a source of current, 41 and 42 are fixed contacts mounted on the instrument 25, which contacts are adapted to be engaged by the needle 44 of the instrument, when the voltage across the instrument varies in one direction or the other from a desired range and so close a circuit through one or the other of the magnets 17, 17'. The needle 44 is connected by a conductor 46 to one terminal of the source 40 the other terminal of the source being connected through a conductor 47 to one terminal of each of the electromagnets 17 and 17'. Fixed contact 41 is connected to one terminal of the magnet 17 through a conductor 48 and fixed contact 42 is connected to one terminal of the magnet 17' through conductor 49. When the needle 44 engages the contact 41 a circuit is completed through magnet 17 which may operate the valve 16 to increase the rate of flow through the pipe 11 and when the needle 44 engages the contact 42 a circuit is completed through the magnet 17' and the valve 16 may be operated to decrease the rate of flow through pipe 11.

The resistance 28 may if desired be inserted in the leg 21 instead of the leg 22 in which case resistance such as that shown in the leg 21 will be inserted in the leg 22.

In the modified form of my invention shown in Fig. 2 I employ three thermo couples connected in series, one thermo couple 60 being located in the pipe 11 and subjected to the temperature of the liquid flowing therethrough, another thermo couple 61 being located in the pipe 12 and subject to the temperature of the liquid flowing therethrough, and the third thermo couple 63 being located in the container 10 and subject to the temperature of the mixed liquid 29 therein. The thermo couples are all connected in series across the terminals of the voltmeter or other instrument 65 and are connected with one another such that the potential of thermo couples 60 and 61 are additively opposed to the potential of thermo couple 63. It may be assumed that the voltages of the three thermo couples are the same when all are subjected to the same elevated temperature and in such case the instrument 65 would register the voltage of one of the thermo couples. Thus if each thermo couple generates a voltage 10 at a certain temperature when all are at this temperature the volt meter 65 will measure 10 volts. If the temperature of the thermo couple 60 is such that its voltage is 12; the temperature of the thermo couple 61 is such that its voltage is 10 and the temperature of the thermo couple 63 is such that its voltage is 11 the voltage measured by the voltmeter will be 11. This may represent the desired condition and require no alterations in the rate of supplying acids to the container 10. If the concentration of the weaker acid supplied, say through the pipe 11 should rise (its temperature remaining the same) the temperature of the mixture would change and if we assume that the temperature of the mixture falls to a point such that the voltage of the thermo couple 63 becomes 10 the instrument 65 will measure a voltage of 12 instead of 11 as formerly and this change in voltage will indicate to the operator the necessity of adjusting one or the other of the valves 13, 14 to diminish the supply through pipe 11 or increase the supply through pipe 12. Conversely a decrease in the concentration of the acid supplied through pipe 11 will result in the instrument 65 registering a lower voltage and require a further opening of the valve 13 or a closing of the valve 14. Such regulation of the rate of supply may be effected automatically by means similar to that shown in Fig. 1.

While I have illustrated the application of my invention to the control of a mixing operation it is apparent that the apparatus disclosed by me may be employed to control other devices and operations when such control is determined by variations in the relation between the average of two temperatures and the third temperature. By including several thermometer resistances in the leg 22 of bridge 18 (Fig. 1) comparison may be made between the average temperature of the thermometer resistances 30 and 31 and the average temperature of the several resistances in the leg 22.

I claim:

1. Apparatus for comparing the average of a plurality of temperatures with another temperature or with the average of the plurality of other temperatures, comprising an electrical measuring instrument, a circuit connected therewith comprising a plurality of means in series in said circuit, each of said means being subject to one of said plurality of temperatures and each constructed and arranged in said circuit, such that a change in temperature to which it is subjected tends to increase the current in said instrument and means in said circuit subject to said other temperature or to said plurality of other temperatures, said last means being so constructed and arranged in said circuit that a similar change in the temperature or in the average of the temperatures to which said last means is subjected tends to decrease the current through said instrument.

2. A bridge circuit comprising legs and a bridging portion having a measuring instrument therein, one of said legs comprising a device adapted to change electric characteristics of the circuit in response to changes in temperatures to which said device is subjected and adjacent leg of said bridge circuit comprising two or more devices in series, each of which is adapted to change an electrical characteristic of said circuit in response to changes in temperature to which it is subjected and means to subject said devices severally to different temperatures.

3. A bridge circuit comprising legs and a bridging portion having a measuring instrument therein, one of said legs comprising a conductor adapted to change its resistance in response to changes in temperature to which said conductor is subjected and an adjacent leg comprising two or more conductors in series each of which is adapted to change its resistance in response to changes in temperature to which it is subjected and means to subject said conductors severally to different temperatures.

4. A bridge circuit comprising legs and a bridging portion having a measuring instrument therein, one of said legs comprising a thermometer resistance and an adjacent leg comprising two thermometer resistances in series.

5. A bridge circuit comprising legs and a bridging portion having a measuring instrument therein, one of said legs comprising a thermometer resistance and an adjacent leg comprising two thermometer resistances in series, the values of said latter resistances being each equal to one-half the value of said former resistance at any one temperature.

6. The combination of a container, means for supplying materials thereto, and an electric circuit comprising a Wheatstone bridge having legs and a bridging portion, one of said legs including a thermometer resistance subject to a temperature of material in said container and an adjacent leg including a plurality of thermometer resistances in series, each of which is subject to the temperature of one of the materials supplied to said container, a measuring instrument in said bridging portion and means controlled by said instrument to regulate the supply of one of said materials to said container.

7. The combination of a container, means for supplying materials thereto, and an electric circuit comprising a Wheatstone bridge having legs and a bridging portion, one of said legs including a thermometer resistance subject to the temperature of material in said container and an adjacent leg including a plurality of thermometer resistances in series, each of which is subject to the temperature of one of the materials supplied to said container, a measuring instrument in said bridging portion and means controlled by said instrument to regulate the supply of one of said materials to said container.

RALPH W. NEWCOMB.